(12) United States Patent
MacDonald

(10) Patent No.: US 11,209,893 B2
(45) Date of Patent: *Dec. 28, 2021

(54) ELECTRONIC DEVICE HAVING AN ACTIVE EDGE

(71) Applicant: Intel Corporation, Santa Clara, CA (US)

(72) Inventor: Mark MacDonald, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/984,477

(22) Filed: Aug. 4, 2020

(65) Prior Publication Data

US 2021/0055780 A1 Feb. 25, 2021

Related U.S. Application Data

(63) Continuation of application No. 16/175,045, filed on Oct. 30, 2018, now Pat. No. 10,768,686, which is a
(Continued)

(51) Int. Cl.
*G06F 1/32* (2019.01)
*G06F 1/20* (2006.01)
(Continued)

(52) U.S. Cl.
CPC .......... *G06F 1/3262* (2013.01); *G06F 1/1626* (2013.01); *G06F 1/1632* (2013.01);
(Continued)

(58) Field of Classification Search
CPC ........ G06F 1/3262; G06F 1/3296; G06F 1/20; G06F 1/203; G06F 1/206; G06F 1/1626;
(Continued)

(56) References Cited

U.S. PATENT DOCUMENTS 5,313,362 A * 5/1994 Hatada .................... G06F 1/203
361/709
5,329,427 A * 7/1994 Hogdahl ................... G06F 1/16
361/728
(Continued)

FOREIGN PATENT DOCUMENTS

| CN | 101742833 | 6/2010 |
| CN | 102427702 | 4/2012 |
| TW | M434974 | 8/2012 |

OTHER PUBLICATIONS

Taiwanese"Office action" issued in connection with application No. 102147941 dated Jul. 8, 2015, 12 pages. English translation not available.

(Continued)

*Primary Examiner* — Jaweed A Abbaszadeh
*Assistant Examiner* — Cheri L Harrington
(74) *Attorney, Agent, or Firm* — Hanley, Flight & Zimmerman, LLC

(57) ABSTRACT

An electronic device is provided that includes a base, a processor, and a tablet having a front surface, a rear surface and a bottom edge surface. A processor may operate at a first operating condition when the tablet is coupled to the base, and the processor may operate at a second operating condition when the tablet is not coupled to the base. The tablet may include a heat conducting device and an active edge. The heat conducting device may conduct heat from the processor to the active edge where the heat may be dissipated using supplemental cooling.

20 Claims, 5 Drawing Sheets

Related U.S. Application Data continuation of application No. 15/236,571, filed on Aug. 15, 2016, now Pat. No. 10,114,444, which is a continuation of application No. 13/728,198, filed on Dec. 27, 2012, now Pat. No. 9,436,240.

(51) Int. Cl.
    *G06F 1/16*         (2006.01)
    *G06F 1/3234*     (2019.01)
    *G06F 1/3296*     (2019.01)

(52) U.S. Cl.
    CPC .............. *G06F 1/203* (2013.01); *G06F 1/206* (2013.01); *G06F 1/3296* (2013.01)

(58) Field of Classification Search
    CPC .............. G06F 1/1632; H05K 7/20952; H05K 7/20963; H05K 7/2039
    See application file for complete search history.

(56) References Cited

U.S. PATENT DOCUMENTS

| | | | | |
|---|---|---|---|---|
| 5,381,043 | A * | 1/1995 | Kohiyama | G06F 1/1626 307/116 |
| 5,825,617 | A * | 10/1998 | Kochis | H04M 1/02 361/679.43 |
| 5,884,049 | A | 3/1999 | Atkinson | |
| 5,959,836 | A | 9/1999 | Bhatia | |
| 6,172,871 | B1 | 1/2001 | Holung et al. | |
| 6,313,987 | B1 | 11/2001 | OConnor et al. | |
| 6,415,612 | B1 | 7/2002 | Pokharna et al. | |
| 6,493,226 | B1 | 12/2002 | Noguchi et al. | |
| 6,903,930 | B2 | 6/2005 | DiStefano et al. | |
| 7,375,967 | B2 * | 5/2008 | Huang | G06F 1/1632 165/104.33 |
| 7,472,215 | B1 | 12/2008 | Mok et al. | |
| 7,764,501 | B2 | 7/2010 | Gu et al. | |
| 8,760,864 | B2 | 6/2014 | Chiang | |
| 9,426,905 | B2 * | 8/2016 | Bathiche | G06F 1/1679 |
| 9,436,240 | B2 | 9/2016 | MacDonald | |
| 10,114,444 | B2 | 10/2018 | MacDonald | |
| 10,768,686 | B2 | 9/2020 | MacDonald | |
| 2003/0154291 | A1 * | 8/2003 | Ocheltree | G06F 1/1615 709/228 |
| 2004/0130869 | A1 | 7/2004 | Fleck et al. | |
| 2004/0130870 | A1 | 7/2004 | Fleck et al. | |
| 2004/0261422 | A1 * | 12/2004 | McEuen | G06F 1/1626 62/3.2 |
| 2006/0232928 | A1 | 10/2006 | Vinson et al. | |
| 2009/0244843 | A1 | 10/2009 | Hirohata et al. | |
| 2010/0124016 | A1 | 5/2010 | Gu et al. | |
| 2010/0162035 | A1 | 6/2010 | Rancurel et al. | |
| 2010/0167096 | A1 | 7/2010 | Flannery | |
| 2011/0162035 | A1 | 6/2011 | King et al. | |
| 2012/0206942 | A1 | 8/2012 | Bae et al. | |
| 2013/0021806 | A1 | 1/2013 | Chiang | |
| 2013/0083253 | A1 | 4/2013 | Maeshima et al. | |
| 2013/0083254 | A1 | 4/2013 | Murakami et al. | |
| 2013/0083257 | A1 * | 4/2013 | Murakami | G06F 1/1635 348/839 |
| 2013/0170126 | A1 | 7/2013 | Lee | |
| 2013/0186598 | A1 * | 7/2013 | Rubenstein | G06F 1/20 165/104.21 |
| 2013/0194513 | A1 | 8/2013 | Kitamura et al. | |
| 2013/0286590 | A1 | 10/2013 | Iwata | |
| 2013/0309899 | A1 | 11/2013 | Sehmbey et al. | |
| 2013/0319640 | A1 * | 12/2013 | Cavallaro | G06F 1/206 165/121 |
| 2014/0098486 | A1 * | 4/2014 | Davis | G06F 1/1607 361/679.41 |
| 2014/0133080 | A1 | 5/2014 | Hwang et al. | |
| 2014/0169853 | A1 | 6/2014 | Sharma et al. | |
| 2014/0189341 | A1 | 7/2014 | MacDonald | |
| 2014/0245029 | A1 * | 8/2014 | Jain | G06F 1/1632 713/300 |
| 2014/0285960 | A1 | 9/2014 | Sharma et al. | |
| 2017/0038820 | A1 | 2/2017 | MacDonald | |

OTHER PUBLICATIONS

United States Patent and Trademark Office, "Non-Final Office Action," issued in connection with U.S. Appl. No. 13/728,198, dated Jun. 3, 2015, 17 pages.

Chinese office action issued in application No. 201310757404.0 dated Oct. 8, 2016, 12 pages. English translation not available.

United States Patent and Trademark Office, "Final Office Action," issued in connection with U.S. Appl. No. 13/728,198, dated Oct. 8, 2015, 20 pages.

United States Patent and Trademark Office, "Notice of Allowance," issued in connection with U.S. Appl. No. 13/728,198, dated May 12, 2016, 9 pages.

United States Patent and Trademark Office, "Advisory Action" issued in connection with U.S. Appl. No. 13/728,198, dated Feb. 26, 2016, 3 pages.

United States Patent and Trademark Office, "Non-Final Office Action" issued in connection with U.S. Appl. No. 15/236,571, dated Jan. 23, 2018, 15 pages.

United States Patent and Trademark Office, "Notice of Allowance," issued in connection with U.S. Appl. No. 15/236,571, dated Jun. 22, 2018, 7 pages.

United States Patent and Trademark Office, "Non-Final Office Action" issued in connection with U.S. Appl. No. 16/175,045, dated Oct. 3, 2019, 29 pages.

United States Patent and Trademark Office, "Notice of Allowance" issued in connection with U.S. Appl. No. 16/175,045, dated May 6, 2020, 10 pages.

United States Patent and Trademark Office, "Final Office Action" issued in connection with U.S. Appl. No. 16/175,045, dated Jan. 17, 2020, 17 pages.

\* cited by examiner

ELECTRONIC DEVICE HAVING AN ACTIVE EDGE

RELATED APPLICATIONS

This patent is a continuation of U.S. patent application Ser. No. 16/175,045, filed on Oct. 30, 2018, entitled "ELECTRONIC DEVICE HAVING AN ACTIVE EDGE," which is a continuation of U.S. patent application Ser. No. 15/236,571 (now U.S. Pat. No. 10,114,444), filed on Aug. 15, 2016, entitled "ELECTRONIC DEVICE HAVING AN ACTIVE EDGE," which is a continuation of U.S. patent application Ser. No. 13/728,198 (now U.S. Pat. No. 9,436,240), filed on Dec. 27, 2012, entitled "ELECTRONIC DEVICE HAVING AN ACTIVE EDGE." Priority is claimed to U.S. patent application Ser. No. 16/175,045, U.S. patent application Ser. No. 15/236,571, and U.S. patent application Ser. No. 13/728,198. U.S. patent application Ser. No. 16/175,045, U.S. patent application Ser. No. 15/236,571, and U.S. patent application Ser. No. 13/728,198 are hereby incorporated by this reference in their entireties.

BACKGROUND

1. Field

Embodiments may relate to a passively cooled electronic device, such as a tablet-type computer or a notebook-type computer.

2. Background

Computers and/or tablets may generate heat when operating. A fan may be provided within the computer and/or tablet in order to conduct or dissipate the generated heat.

BRIEF DESCRIPTION OF THE DRAWINGS

Arrangements and embodiments may be described in detail with reference to the following drawings in which like reference numerals refer to like elements and wherein.

DETAILED DESCRIPTION

Arrangements and embodiments may be described with respect to a tablet-type computer and/or a notebook-type computer. Arrangements and embodiments are also applicable to other electronic devices.

As used hereinafter, embodiments may refer to a tablet. The tablet may be one component of a detachable tablet-type computer (or a detachable notebook-type computer).

Figure 1A:
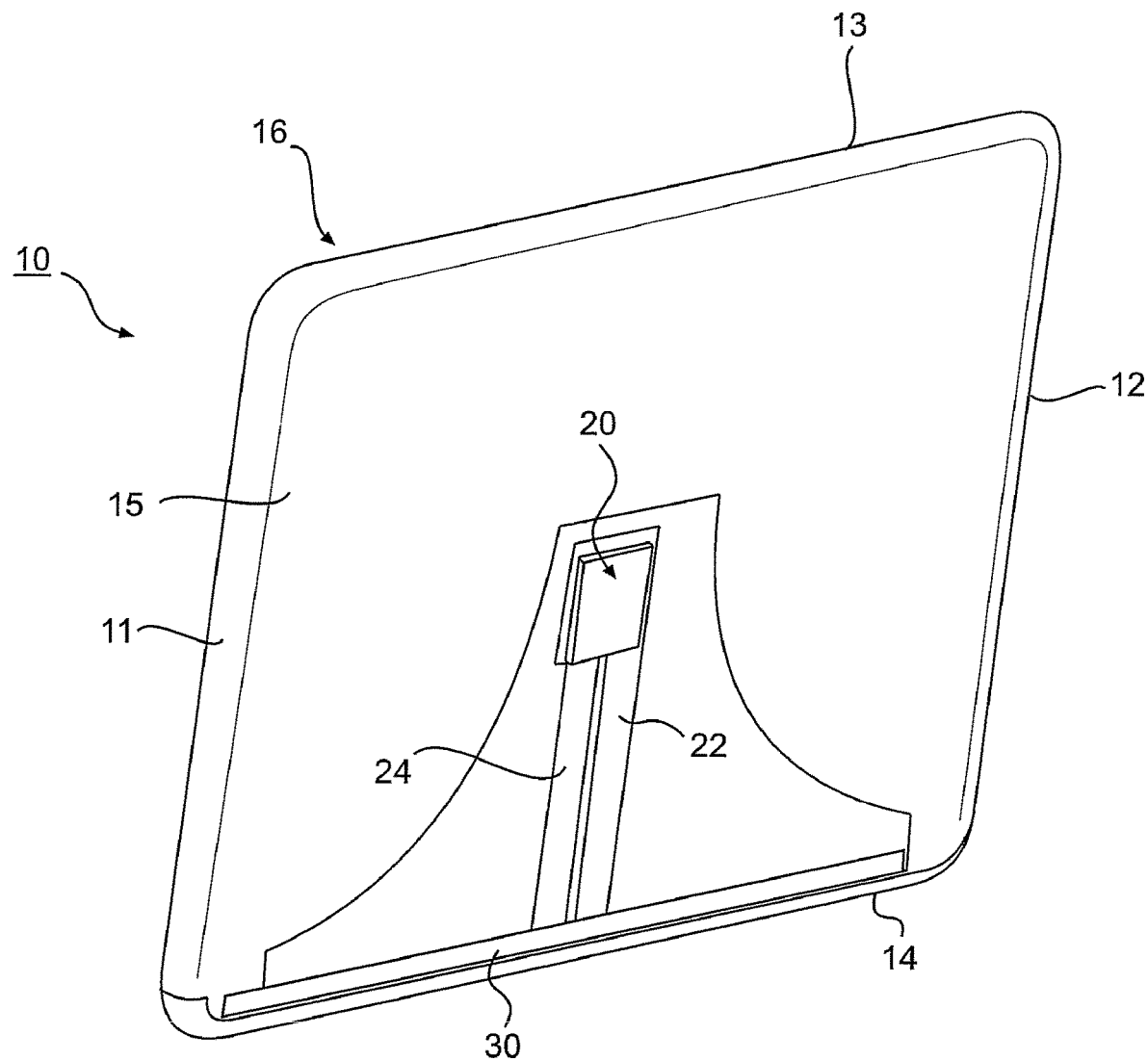
FIGS. 1A-1B are rear and front views of a passively cooled tablet according to an example embodiment.
Figure 1B:
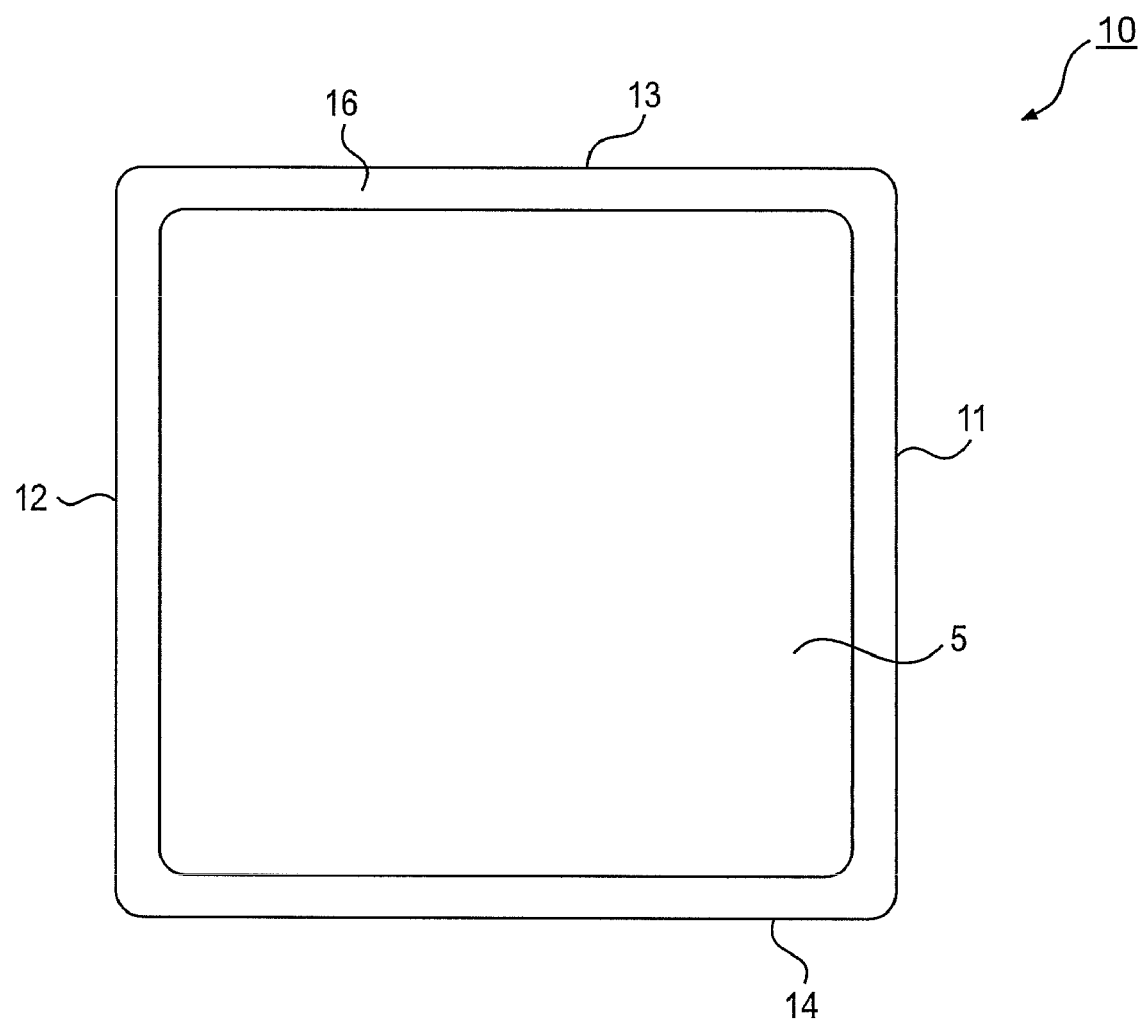

FIG. 1A is a rear view of a passively cooled tablet according to an example embodiment. FIG. 1B is a front view of the tablet. Other embodiments and configurations may also be provided. The tablet is one component of a computer system.

FIG. 1A shows a tablet 10 from a rear view and FIG. 1B shows the tablet 10 from a front view. The tablet 10 may be called a detachable tablet. The tablet 10 may include a display 5, a processor 20, a chipset, a WiFi component, a memory and a battery. Other components may also be provided on or at the tablet 10.

The display 5 may be provided on a front surface 16 (or side) of the tablet 10. A touchscreen of the display 5 may be provided within outer edges of the tablet 10. FIGS. 1A-1B show the tablet 10 provided in a tablet mode in which a user may carry or hold (or provide) the tablet 10. Various operations may be performed while in the tablet mode 10.

The battery may supply power to the tablet 10 when the tablet 10 is not electrically connected to a power source. The display may be a touch screen.

FIG. 1A shows that the processor 20 may be provided between a rear surface 15 (or side) and the front surface 16 (or side) of the tablet 10. The tablet 10 may include a first side edge 11, a second side edge 12, a top side edge 13 and a bottom side edge 14. The use of terms top and bottom are merely to describe an orientation of the tablet 10 as shown in the figure.

FIG. 1A also shows a first heat pipe 22, a second heat pipe 24 and an active edge 30. The active edge 30 may also be called an active member and/or a heat conducting active member. The active edge may be a portion of an outer surface (or indented surface) of a tablet portion of a computer through which heat transfer (or heat conduction) may be directed or manipulated through adjustments of processor (CPU)/system on chip (SoC) operating conditions.

For ease of description, the following description may refer to the active edge 30 rather than the heat conducting active member. Additionally, the following description may refer to the first heat pipe 22 and the second heat pipe 24. However, a heat conducting device(s) and/or a heat dissipating device(s) may be provided rather than (or as) the first and second heat pipes 22, 24. For example, a single heat pipe may be provided rather than the first heat pipe 22 and the second heat pipe 24.

The first heat pipe 22 and the second heat pipe 24 may physically contact the processor 20 to dissipate or conduct heat away from the processor 20. The first heat pipe 22 and the second heat pipe 24 may also physically contact the active edge 30. The active edge 30 may receive the heat from the first and second heat pipes 22, 24 (or other heat conducting member).

The first heat pipe 22 and the second heat pipe 24 may serve to dissipate or conduct heat from the processor 20 (or other electronic component) to the active edge 30. The first and second heat pipes 22, 24 may be considered a passive heat conducting device (and/or a heat dissipating device and/or a heat moving device). Other types of heat conducting devices (or heat dissipating devices) may also be provided between the processor 20 and the active edge 30. For example, a heat moving device may be provided to conduct heat from one location (on the tablet 10) to another location (on the tablet 10).

In at least one embodiment, a single heat pipe may be provided (rather than the first and second heat pipes 22, 24) between the processor 20 and the active edge 30 to conduct or dissipate heat from the processor 20 to the active edge 30.

In at least one embodiment, a heat spreader (such as copper, aluminum or graphite) may be provided between the processor 20 and the active edge 30 to conduct or dissipate heat from the processor 20 to the active edge 30. The heat spreader may be provided rather than the first and second heat pipes 22, 24.

The heat conducting device may be a metal or graphite structure between the processor 20 and the active edge 30 to conduct heat from the processor 20 to the active edge 30. Additionally and/or alternatively, the heat conducting device may be a vapor chamber between the processor 20 and the active edge 30 to conduct or dissipate heat from the processor 20 to the active edge 30.

The active edge 30 (or the heat conducting active member) may be a metallic device provided at or near the bottom side edge 14 of the tablet 10 between the front surface 16 and the rear surface 15. The active edge 30 (at or near the bottom edge 14 of the tablet 10) may be made of a metal material, and/or may be provided in a bar-shaped form. The active edge 30 in the bar-shaped form may extend between the first side edge 11 and the second side edge 12 of the tablet 10. The active edge 30 may be provided in a bar-shape at an area near the bottom side edge 14 of the tablet 10.

The active edge 30 (or heat conductive active member) may be exposed to outside of the tablet 10 such that heat may passively exit the tablet 10. The active edge 30 may be slightly embedded into the bottom side edge 14 of the tablet 10. This may help avoid a user from touching the active edge 30, which may be heated during use of the tablet 10.

FIG. 1A shows heat routing to the active edge 30. The first heat pipe 22 and the second heat pipe 24 (or other heat conducting device) may be provided in a space between the front surface 16 and the rear surface 15 of the tablet 10. In other words, the first heat pipe 22 and the second heat pipe 24 may be isolated from skins of the tablet 10 without the first heat pipe 22 and the second heat pipe 24 contacting the front surface 16 and the rear surface 15 of the tablet 10. The first heat pipe 22 and the second heat pipe 24 may be thermally isolated from the front surface 16 (of the tablet 10) and from the rear surface 15 (of the tablet 10).

In at least one embodiment, another type of heat moving device (such as a heat spreader) may be isolated from skins of the tablet 10 without the heat moving device contacting the front surface 16 and the rear surface 15 of the tablet 10. The heat moving device and/or the heat spreader may be thermally isolated from the front surface 16 and the rear surface 15 of the tablet 10.

Figure 2:
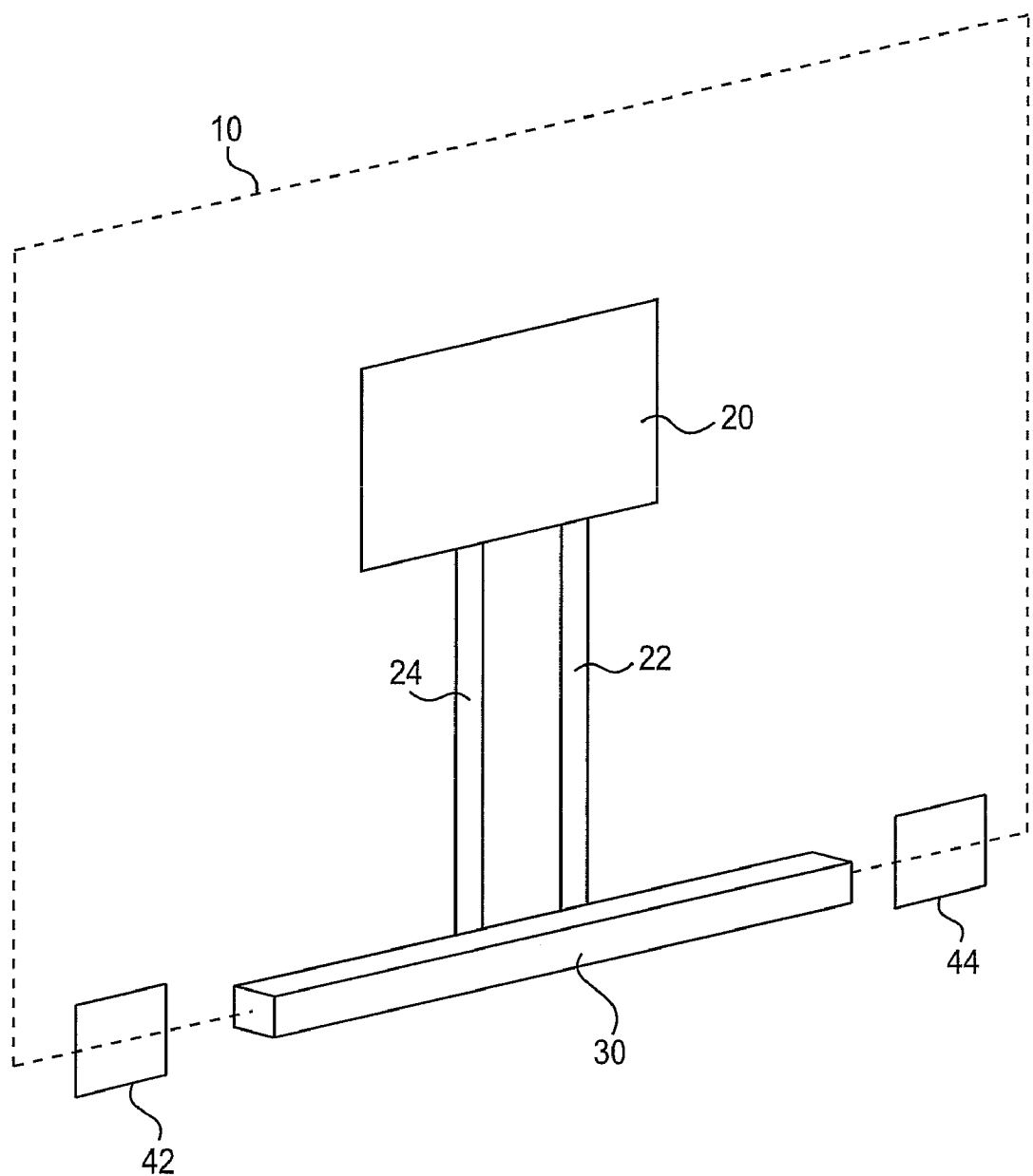
FIG. 2 is a view (from inside the tablet) of the active edge.

FIG. 2 is a view (from inside the tablet 10) of the active edge 30. As shown, the first heat pipe 22 may directly contact the active edge 30 so that heat may be dissipated directly to the active edge 30. Likewise, the second heat pipe 24 may directly contact the active edge 30 so that heat may be dissipated directly to the active edge 30.

The active edge 30 may be bar-shaped and extend from one side toward another side. The active edge 30 may be provided right at the bottom side edge 14 or the active edge 30 may be provided within the tablet 10 such that the active edge is not visually seen easily.

FIG. 2 also shows that a first connector 42 at one end of the active edge 30 and a second connector 44 at the other end of the active edge 30. The first and second connectors 42, 44 may provide electrical and/or mechanical connections with a base.

Figure 3:
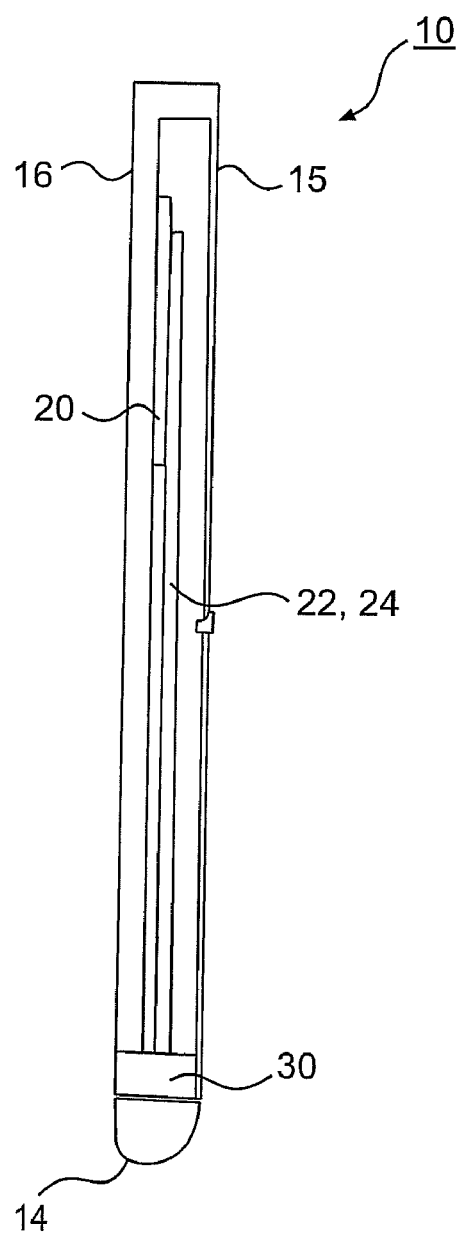
FIG. 3 is a side view of a passively cooled tablet according to an example embodiment.

FIG. 3 is a side view of the tablet 10 according to an example embodiment. Other embodiments and configurations may also be provided.

More specifically, FIG. 3 shows the first heat pipe 22 and the second heat pipe 24 between the front surface 16 and the rear surface 15. The first and second heat pipes 22, 24 may be isolated from the front surface 16 and the rear surface 15 without the first heat pipe 22 and the second heat pipe 24 physically contacting the front surface 16 and the rear surface 15 of the tablet 10.

FIG. 3 shows the active edge 30 is located at or near the bottom side edge 14 of the tablet 10. The active edge 30 may have a width that generally corresponds to distance between the front surface 16 and the rear surface 15 of the tablet 10. However, the active edge 30 may have a smaller width.

Figure 4:
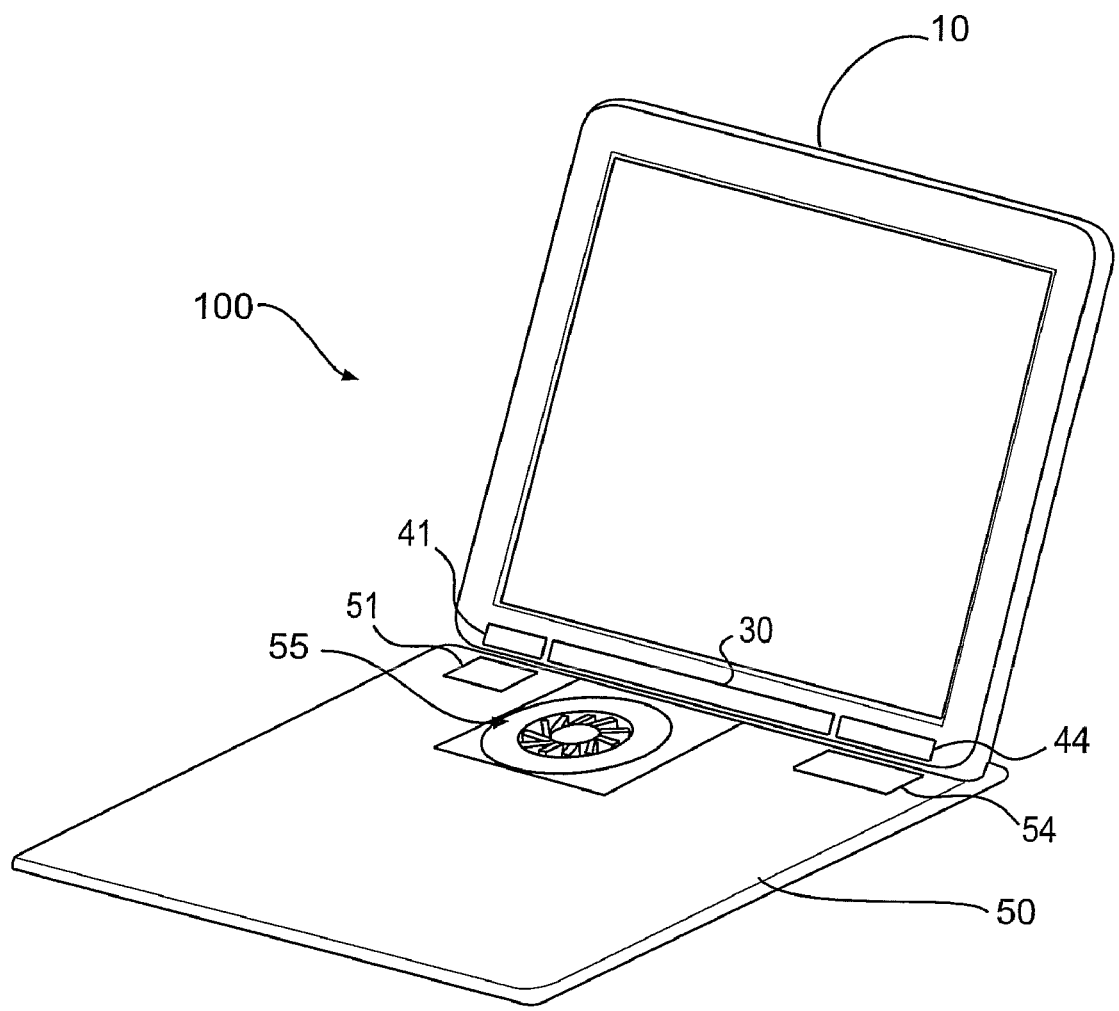
FIG. 4 is a view of a tablet and a base according to an example embodiment.

FIG. 4 shows a tablet mounted at a base according to an example embodiment. Other embodiments and configurations may also be provided.

More specifically, FIG. 4 shows the tablet 10 mounted at a base 50 and provided in a clamshell mode. The tablet 10 may be mounted to the base 50 along the bottom side edge 14 of the tablet 10. The base 50 may include a keyboard to enter information. When provided in the clamshell mode, the tablet 10 and the base 50 may be considered a tablet-type computer.

The tablet 10 may be mounted to the base 50 by a power connector, a data connector, a mechanical connector, a docking connector and/or a hinge. FIG. 4 shows these as the first connector 41 and the second connector 44. The base 50 may include a first connector 51 and a second connector 54. The first connector 41 of the tablet 10 is aligned to physically and/or electrically connect to the first connector 51 of the base 50. The second connector 44 of the tablet 10 is aligned to physically and/or electrically connect to the second connector 54 of the base 50. The tablet 10 may therefore be able to obtain power and/or data from the base 50.

FIG. 4 also shows that the base 50 may include a cooling device 55 (shown in a cutout view). The cooling device 55 may include a fan or other air moving device(s). The cooling device 55 may alternatively (or additionally) be a passive cooling device. The cooling device 55 may conduct or dissipate heat from the base 50. The cooling device 55 may also help dissipate heat across the active edge 30 of the tablet 10. The cooling device 55 may also be called a supplemental cooling device.

The cooling device 55 may provide an airflow across the active edge 30 of the tablet 10 when the tablet 10 is coupled to the base 50. The cooling device 55 may dissipate h eat from the active edge 30 of the tablet 10 when the tablet 10 is coupled to the base 50.

Embodiments may provide a detachable tablet 10 in which the tablet 10 may be passively cooled. Supplemental cooling may be provided by the cooling device 55 (at the base 50) when the tablet 10 is docked (or coupled) to the base 50. This may help boost performance.

The processor 20 may produce heat during operation. The first and second heat pipes 22 and 24 (or other heat conducting device) may attempt to conduct or dissipate the heat from the processor 20. When the tablet 10 is docked at (or coupled to) the base 50, then additional cooling may be provided by the cooling device 55. The cooling device 55 may provide an air flow across the active edge 30 of the tablet 10.

The processor 20 may be dynamically configured for both Thermal Design Power (TDP) and maximum junction temperature (Tj). For example, in order to avoid excessive heating, the processor 20 may be dynamically configured to a lower TDP processor value and/or a lower Tj processor value.

TDP and Tj processor values may be used simultaneously and dynamically in the tablet 10.

The processor values may be used to control overall performance of the processor 20 based at least in part on whether the tablet 10 is docked to (or coupled to) the base 50.

The Tj processor value may be set to a lower value for when the tablet 10 is operating in the tablet mode (by not being docked to the base 50). As one example, the Tj processor value may be 60° C. when operating in the tablet mode.

On the other hand, when the tablet 10 is docked to the base 50 in the clamshell mode, the Tj processor value may be set to a higher temperature, such as 90° C. This higher temperature value may allow the active edge 30 (or heat conducting active member) to heat up to a higher value than in the tablet mode. Other components of the tablet 10 may or may not be heated up to the same value as the active edge 30. For example, the active edge 30 may have a temperature that is 15-20° C. higher when the tablet-type computer is provided in the clamshell mode as compared to the tablet mode. The higher temperature on the active edge 30 may receive supplemental active cooling from the base 50 to remove significant heat from the base 50. In this example, the TDP processor value may be dynamically configured to allow for higher power levels on the processor 20.

The processor 20 may therefore operate at a first operating condition (such as a first temperature limit) when the tablet 10 is coupled to the base 50 (or docked to the base 50), and the processor 20 may operate at a second operating condition (such as a second temperature limit) when the tablet 10 is not coupled to the base 50 (or is detached from the base 50), and the first temperature limit may be greater than the second temperature limit.

The lower Tj processor value in the tablet mode may help battery life and a lower temperature of the front surface 16 and the rear surface 15.

Embodiments may change a maximum operating condition (such as temperature) of the processor 20 (or other electronic component) based on whether the tablet 10 is docked or is undocked. This may change performance of the processor 20 (and the tablet 10).

In at least one embodiment, the processor 20 may operate at a first operating condition(s) when the tablet 10 is docked to the base 50 (in the clamshell mode), and the processor 20 may operate at a second operating condition(s) when the tablet 10 is not docked to the base 50 (in the tablet mode). The first operating conditions may be any one of processor frequency, voltage and/or current conditions that are higher (or faster) than the second operating conditions that may be any one of processor frequency, voltage and/or current conditions.

The first operating condition may be a first temperature limit of the processor 20 and the second operating condition may be a second temperature limit of the processor 20, where the first temperature limit is greater than the second temperature limit.

The first operating condition may be a first frequency of the processor 20, and the second operating condition may be a second frequency of the processor, where the first frequency is faster than the second frequency.

The first operating condition may be a first current of the processor 20, and the second operating condition may be a second current of the processor 20, where the first current is greater than the second current.

The first operating condition may be a first voltage of the processor 20, and the second operating condition may be a second voltage of the processor 20, and the first voltage may be greater than the second voltage.

Heat may be conducted or dissipated from the processor 20 to the active edge 30 on or at the bottom side edge 14 of the tablet 10. The cooling device 55 may be an active device to blow air out of the tablet-type computer in a backwards direction. The supplemental active cooling by the cooling device 55 may cool the tablet 10 (in the clamshell mode) using an external air flow along the bottom side edge 14. The external air flow may obviate the need for added tablet thickness or venting for accommodation of higher docked processor power levels.

The active edge 30 (or the heat conducting active member) may be protected from user contact by the docking mechanism of the base 50. The active edge 30 may also be called a heat spreader. The active edge 30 may be exposed to outside of the tablet 10.

Embodiments may provide (or determine) a maximum operating temperature (i.e., a temperature limit) of the processor 20 based on whether the tablet 10 is docked to (or coupled to) the base 50 or is not docked to (or detached from) the base 50. The determination of whether the tablet 10 is docked (or coupled) may be based on one of the connectors between the base 50 and the tablet 10. Accordingly, the processor power may be dynamically modulated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
    a tablet having:
        a first surface;
        a second surface;
        a first corner;
        a second corner;
        a third corner;
        a fourth corner;
        a first edge;
        a second edge, the first and second edges joined by the first corner;
        a third edge opposite the second edge, the first and third edges joined by the second corner;
        a fourth edge opposite the first edge, the third and fourth edges joined by the third corner, and the second and fourth edges joined by the fourth corner;
        a touchscreen display at the first surface;
        a processor in the tablet;
        memory; and
        a battery;
    a base having a keyboard;
    a hinge to couple the first edge of the tablet to the base, the processor to operate at a first operating condition when the tablet is coupled to the base, the first operating condition associated with a first processor frequency, and the processor to operate at a second operating condition when the tablet is not coupled to the base, the second operating condition associated with a second processor frequency, the first processor frequency faster than the second processor frequency;

an elongated heat conductor extending through an internal portion within the tablet toward the first edge, the elongated heat conductor contained within the tablet between the first surface and the second surface of the tablet;

a heat sink between the first surface and the second surface of the tablet and at the first edge of the tablet, the heat sink physically connected to the elongated heat conductor, the heat conductor to provide heat to the heat sink, the heat sink to dissipate heat from the interior of the tablet to the first edge of the tablet;

a first connector at the first edge of the tablet on a first side of the heat sink between the heat sink and the first corner;

a second connector at the first edge of the tablet on a second side of the heat sink between the heat sink and the second corner;

a third connector at the base to releasably physically connect with the first connector; and a fourth connector at the base to releasably physically connect with the second connector, wherein the first connector, the second connector, the third connector, and the fourth connector are to releasably physically couple the tablet to the base in a clamshell configuration.

2. The electronic device of claim 1, further including a fan in the base to dissipate heat from the tablet when the tablet is coupled to the base.

3. The electronic device of claim 1, further including a plurality of fans.

4. The electronic device of claim 2, wherein the fan is to provide airflow past at least a portion of the heat sink.

5. The electronic device of claim 1, wherein the heat conductor extends from a central portion of the tablet toward the first edge.

6. The electronic device of claim 1, wherein the first connector is located closer to the third edge than the second edge.

7. The electronic device of claim 1, wherein the second connector is located closer to the second edge than the third edge.

8. The electronic device of claim 1, wherein the first connector and the second connector are on opposite sides of the first edge.

9. The electronic device of claim 1, wherein the heat conductor is a single heat pipe.

10. The electronic device of claim 1, wherein the heat conductor is physically connected to the heat sink.

11. The electronic device of claim 1, wherein the heat sink is embedded in the tablet away from an exterior surface of the first edge.

12. The electronic device of claim 1, wherein the front surface and the rear surface are separated a distance, and the heat sink has a width less than the distance.

13. The electronic device of claim 1, wherein the heat conductor extends over a center axis of the tablet at at least one point.

14. An electronic device comprising:
a tablet having:
a first surface;
a second surface;
a first corner;
a second corner;
a third corner;
a fourth corner;
a first edge;
a second edge, the first and second edges joined by the first corner;
a third edge opposite the second edge, the first and third edges joined by the second corner;
a fourth edge opposite the first edge, the third and fourth edges joined by the third corner, and the second and fourth edges joined by the fourth corner;
a touchscreen display at the first surface;
a processor in the tablet;
memory; and
a battery;
a base having a keyboard;
a hinge to couple the first edge of the tablet to the base, the processor to operate at a first operating condition when the tablet is coupled to the base, the first operating condition associated with a first processor frequency, and the processor to operate at a second operating condition when the tablet is not coupled to the base, the second operating condition associated with a second processor frequency, the first processor frequency faster than the second processor frequency;
an elongated heat conductor extending within the tablet toward the first edge, the elongated heat conductor within the tablet between the first surface and the second surface of the tablet, the elongated heat conductor within the tablet between the second edge and the third edge;
a heat sink between the first surface and the second surface of the tablet and at the first edge of the tablet, the heat sink physically connected to the elongated heat conductor, the heat conductor to provide heat to the heat sink, the heat sink to dissipate heat from the interior of the tablet to the first edge of the tablet;
a first connector at the first edge of the tablet on a first side of the heat sink between the heat sink and the first corner;
a second connector at the first edge of the tablet on a second side of the heat sink between the heat sink and the second corner;
a third connector at the base to releasably physically connect with the first connector; and
a fourth connector at the base to releasably physically connect with the second connector, wherein the first connector, the second connector, the third connector, and the fourth connector are to releasably physically couple the tablet to the base in a clamshell configuration.

15. The electronic device of claim 14, wherein at least a portion of the heat conductor is equidistant from the second edge and the third edge.

16. The electronic device of claim 14, wherein the heat conductor extends over a center axis of the tablet.

17. An electronic device comprising:
a tablet having:
a first surface;
a second surface;
a first corner;
a second corner;
a third corner;
a fourth corner;
a first edge;
a second edge, the first and second edges joined by the first corner;

a third edge opposite the second edge, the first and third edges joined by the second corner;
a fourth edge opposite the first edge, the third and fourth edges joined by the third corner, and the second and fourth edges joined by the fourth corner;
a touchscreen display at the first surface;
a processor in the tablet;
memory; and
a battery;
a base having a keyboard;
a hinge to removably couple the first edge of the tablet to the base, the processor to operate at a first operating condition when the tablet is coupled to the base, the first operating condition associated with at least one of a first processor voltage or a first processor current, and the processor to operate at a second operating condition when the tablet is not coupled to the base, the second operating condition associated with at least one of a second processor voltage or a second processor current, the first processor voltage higher than the second processor voltage, and the first processor current higher than the second processor current;
an elongated heat conductor extending in an internal cavity of the tablet toward the first edge, the elongated heat conductor between the first surface and the second surface of the tablet;
a heat sink between the first surface and the second surface of the tablet and at the first edge of the tablet, the heat sink physically connected to the elongated heat conductor, the heat conductor to provide heat to the heat sink, the heat sink to dissipate heat from the interior of the tablet to the first edge of the tablet;
a first connector at the first edge of the tablet on a first side of the heat sink between the heat sink and the first corner;
a second connector at the first edge of the tablet on a second side of the heat sink between the heat sink and the second corner;
a third connector at the base to releasably physically connect with the first connector; and
a fourth connector at the base to releasably physically connect with the second connector, wherein the first connector, the second connector, the third connector, and the fourth connector are to releasably physically couple the tablet to the base in a clamshell configuration.

18. The electronic device of claim 17, wherein the heat conductor extends over a center axis of the tablet.

19. An electronic device comprising:
a tablet having:
a first surface;
a second surface;
a first corner;
a second corner;
a third corner;
a fourth corner;
a first edge;
a second edge, the first and second edges joined by the first corner;
a third edge opposite the second edge, the first and third edges joined by the second corner;
a fourth edge opposite the first edge, the third and fourth edges joined by the third corner, and the second and fourth edges joined by the fourth corner;
a touchscreen display at the first surface;
a processor in the tablet;
memory; and
a battery;
a base having a keyboard;
a hinge to removably couple the first edge of the tablet to the base, the processor to operate at a first operating condition when the tablet is coupled to the base, the first operating condition associated with a first processor temperature, and the processor to operate at a second operating condition when the tablet is not coupled to the base, the second operating condition associated with a second processor temperature, the first temperature higher than the second processor temperature;
an elongated heat conductor extending in an internal portion of the tablet toward the first edge, the elongated heat conductor within the tablet between the first surface and the second surface of the tablet;
a heat sink between the first surface and the second surface of the tablet and at the first edge of the tablet, the heat sink physically connected to the elongated heat conductor, the heat conductor to provide heat to the heat sink, the heat sink to dissipate heat from the interior of the tablet to the first edge of the tablet;
a first connector at the first edge of the tablet on a first side of the heat sink between the heat sink and the first corner;
a second connector at the first edge of the tablet on a second side of the heat sink between the heat sink and the second corner;
a third connector at the base to releasably physically connect with the first connector; and
a fourth connector at the base to releasably physically connect with the second connector, wherein the first connector, the second connector, the third connector, and the fourth connector are to releasably physically couple the tablet to the base in a clamshell configuration.

20. The electronic device of claim 19, further including a plurality of fans in the base provide airflow over the heat sink to dissipate heat from the tablet when the tablet is coupled to the base.

* * * * *